United States Patent
Wu et al.

(10) Patent No.: US 10,954,589 B2
(45) Date of Patent: Mar. 23, 2021

(54) CURRENT COLLECTOR PRODUCTION APPARATUS

(71) Applicant: CONTEMPORARY AMPEREX TECHNOLOGY CO., LIMITED, Ningde (CN)

(72) Inventors: Zuyu Wu, Ningde (CN); Zhen Liu, Ningde (CN); Keqiang Li, Ningde (CN); Long Zhou, Ningde (CN); Guodong Li, Ningde (CN); Taosheng Zhu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 160 days.

(21) Appl. No.: 16/249,983

(22) Filed: Jan. 17, 2019

(65) Prior Publication Data

US 2019/0218654 A1      Jul. 18, 2019

(30) Foreign Application Priority Data

Jan. 17, 2018   (CN) .......................... 201820078394.6

(51) Int. Cl.
   *C23C 8/12*       (2006.01)
   *H01M 4/66*      (2006.01)
   *H01M 10/0525*  (2010.01)

(52) U.S. Cl.
   CPC ............... *C23C 8/12* (2013.01); *H01M 4/661* (2013.01); *H01M 4/664* (2013.01); *H01M 4/667* (2013.01); *H01M 10/0525* (2013.01)

(58) Field of Classification Search
   CPC .......................... H01M 10/0525; H01M 4/664
   See application file for complete search history.

(56) References Cited

U.S. PATENT DOCUMENTS 5,976,258 A * 11/1999 Kleiner .................. C23C 16/46
                                                                118/718
7,972,441 B2 * 7/2011 Yokota .............. H01L 21/02255
                                                                118/715

(Continued)

FOREIGN PATENT DOCUMENTS

WO      2018/142487 A1      8/2018

OTHER PUBLICATIONS

Extended European Search Report dated Jul. 6, 2019, Application No. 19150794.6.

*Primary Examiner* — Scott R Kastler
(74) *Attorney, Agent, or Firm* — The Dobrusin Law Firm, P.C.

(57) ABSTRACT

The present disclosure relates to a current collector production apparatus for producing a current collector. The current collector includes a current collector substrate, a conductive layer disposed on at least one surface of the current collector substrate. The current collector production apparatus includes an oven having a space where the current collector is to be heated, and a passivation ozone knife having a current collector injection port. The current collector injection port is configured to release ozone in such a manner that the ozone reacts with a surface material of the conductive layer, so as to form a passivation layer. The passivation ozone knife is disposed inside the oven. The current collector produced in the present disclosure can prevent HF in electrolyte from reacting with Al, so as to solve a problem of detachment of active material from the current collector and maintain the performance of lithium-ion battery.

14 Claims, 3 Drawing Sheets

(56) References Cited

U.S. PATENT DOCUMENTS

| | | |
|---|---|---|
| 2011/0143019 A1 | 6/2011 | Mosso et al. |
| 2013/0089665 A1 | 4/2013 | Takenaka et al. |
| 2013/0189432 A1 | 7/2013 | Nakashima |
| 2019/0218654 A1* | 7/2019 | Wu .......................... C23C 8/12 |

* cited by examiner

CURRENT COLLECTOR PRODUCTION APPARATUS

CROSS-REFERENCE TO RELATED APPLICATIONS

The present application claims priority to Chinese Patent Application No. 201820078394.6, filed on Jan. 17, 2018, the content of which is incorporated herein by reference in its entirety.

TECHNICAL FIELD

The present disclosure relates to the technical field of production of energy storage devices, and in particular, relates to a current collector production apparatus.

BACKGROUND

Lithium-ion batteries are widely applied in electronic apparatuses such as mobile phones and notebook computers due to their advantages of high energy density and environmental friendliness. In recent years, in order to solve problems of environmental pollution and the increasing gasoline price and energy storage problems, the application range of lithium-ion batteries has rapidly expanded to hybrid electric vehicles and energy storage systems.

A lithium-ion battery includes a housing, an electrode assembly accommodated in the housing, and electrolyte. The electrolyte is required to sufficiently infiltrate electrode plates of the electrode assembly, so as to ensure energy of the lithium-ion battery. However, the current collector of the existing electrode plate is an aluminum foil or a copper foil, and the current collector is coated with an active material. Once the electrolyte is injected into the housing, HF in the electrolyte reacts with Al on the current collector, and generates $AlF_3$ and $H_2$. $AlF_3$ can directly result in a detachment of the active material from the current collector, which would cause serious loss on the performance of the lithium-ion battery.

SUMMARY

The present disclosure provides a current collector production apparatus capable of solving the above problems.

According to the present disclosure, a current collector production apparatus for producing a current collector is provided. The current collector includes a current collector substrate and a conductive layer provided at least on one surface of the current collector substrate. The current collector production apparatus includes: an oven having a space where the current collector is to be heated; and a passivation ozone knife disposed inside the oven and including a current collector injection port. The current collector injection port is configured to release ozone in such a manner that the ozone reacts with a surface material of the conductive layer of the current collector, so as to form a passivation layer.

In an embodiment, the oven includes: an oven main body including two side plates opposite to one another and a top plate that connects the two side plates; two mesh plates arranged in the oven main body, the two mesh plates being opposite to and spaced apart from the two side plates, respectively; and a connecting plate opposite to and spaced apart from the top plate, the connecting plate connecting the two mesh plates. The passivation ozone knife is disposed in a space enclosed by the two mesh plates and the connecting plate.

In an embodiment, the two side plates are opposite to one another with respect to a conveying direction of the current collector production apparatus.

In an embodiment, the oven further includes a fan disposed between the top plate and the connecting plate. Each of the two mesh plates has a plurality of mesh holes, and one of the plurality of mesh holes close to the top plate has a smaller opening area than one of the plurality of mesh holes away from the top plate.

In an embodiment, a plurality of passivation ozone knifes is provided, the current collector injection ports of at least two of the plurality of passivation ozone knifes inject gas in opposite directions, and a current collector accommodating space is formed between the at least two of the plurality of passivation ozone knifes injecting gas in opposite directions.

In an embodiment, the current collector injection ports of the plurality of passivation ozone knifes are disposed in a stagger manner along a conveying direction of the current collector production apparatus.

In an embodiment, the current collector injection port of the passivation ozone knife has a larger width than the current collector substrate.

In an embodiment, the current collector injection port injects gas in a direction perpendicular to the current collector substrate.

In an embodiment, a distance between the current collector injection port and the conductive layer is greater than or equal to 1 mm, and smaller than or equal to 40 mm.

In an embodiment, a distance between the current collector injection port and the conductive layer is greater than or equal to 10 mm, and smaller than or equal to 20 mm.

In an embodiment, the gas speed of the passivation ozone knife is greater than or equal to 5 m/min and smaller than or equal to 50 m/min.

In an embodiment, the gas speed of the passivation ozone knife is greater than or equal to 20 m/min and smaller than or equal to 30 m/min.

In an embodiment, the temperature of the oven is higher than or equal to 100° C., and lower than or equal to 250° C.

In an embodiment, the temperature of the oven is higher than or equal to 200° C. and lower than or equal to 230° C.

In an embodiment, the current collector production apparatus further includes a guiding roller and a tension roller. The guiding roller and the tension roller are disposed on each side of the oven along a conveying direction of the current collector production apparatus, and the guiding roller is closer to the oven than the tension roller along the conveying direction.

In an embodiment, the guiding roller and the tension roller on one side of the oven are symmetric to the guiding roller and the tension roller on the other side of the oven 110.

In an embodiment, the current collector production apparatus further includes two negative pressure transition chambers respectively communicating with two sides of the oven along a conveying direction of the current collector production apparatus.

In an embodiment, a sealing brush is provided at a side of the negative pressure transition chamber facing away from the oven.

The technical solutions according to the present disclosure bring the following beneficial effects.

The current collector production apparatus provided by the present disclosure is provided with an oven and a passivation ozone knife. When the current collector substrate having the conductive layer provided on its surface passes through the oven, the oven heats the current collector substrate and the conductive layer, and at the same time the passivation ozone knife sprays ozone onto the surface of the conductive layer, so that the surface material of the conductive layer chemically reacts with ozone. That is, Al on the conductive layer reacts with ozone to form $Al_2O_3$ as the passivation layer, which can prevent the reaction between Al and HF in the electrolyte. In this way, the problem of detachment of the active material from the current collector can be solved, thereby ensuring the performance of the lithium-ion battery It should be understood that the above general description is merely illustrative, but not intended to limit the present disclosure.

REFERENCE SIGNS

100—current collector production apparatus;
110—oven;
  111—oven main body;
    1111—side plate;
    1112—top plate;
    1113—fixing plate;
    1114—bottom plate;
  112—mesh plate;
  113—connecting plate;
  114—fan;
120—passivation ozone knife;
  121—current collector injection port;
130—negative pressure transition chamber;
140—guiding roller;
150—tension roller;
160—uncoiling roll;
170—coiling roll;
200—current collector;
210—current collector substrate;
220—conductive layer;
230—passivation layer;
S—reaction space.

Accompanying drawings illustrating embodiments according to the present disclosure are incorporated in the description as a part, and used to elaborate the principle of the present disclosure.

DESCRIPTION OF EMBODIMENTS

The present disclosure will be further described below by specific embodiments of the present disclosure in combination with the drawings.

Figure 1:
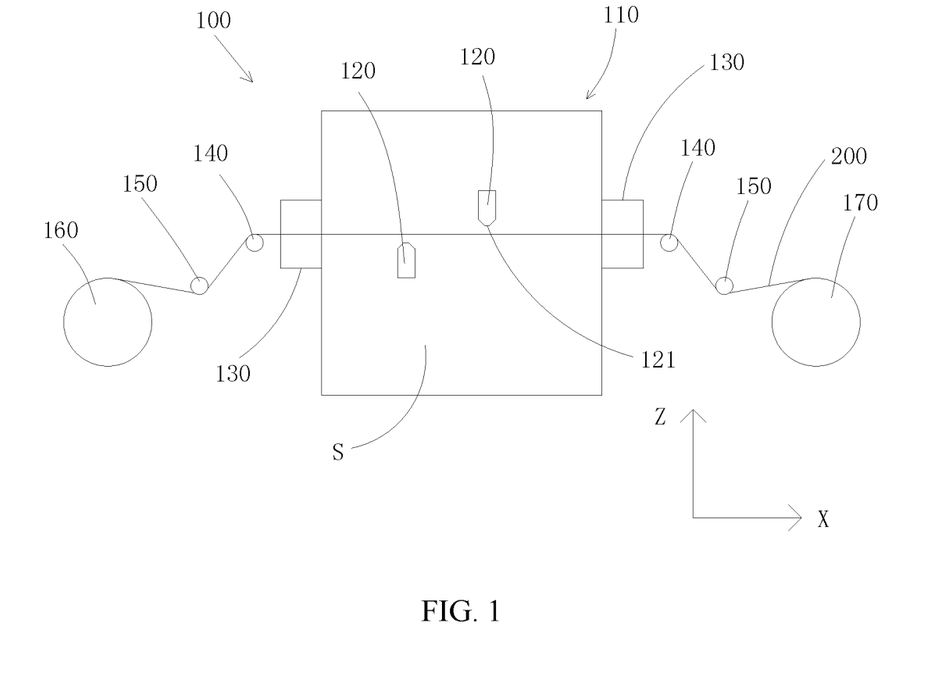
FIG. 1 is a structural schematic diagram of a current collector production apparatus according to an embodiment of the present disclosure.
Figure 2:
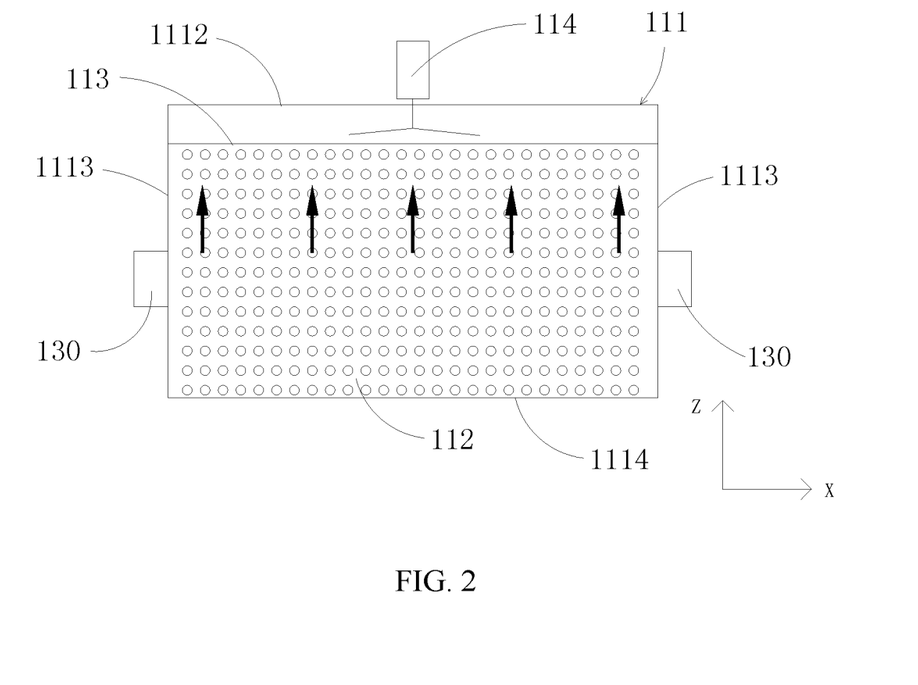
FIG. 2 is a cross-sectional view of an oven of a current collector production apparatus according to an embodiment of the present disclosure.
Figure 3:
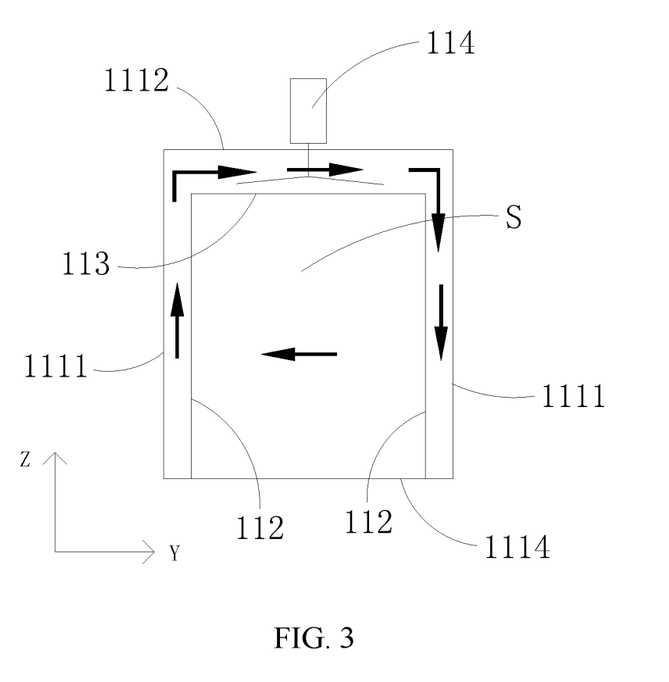
FIG. 3 is a schematic diagram of gas flow in an oven of a current collector production apparatus according to an embodiment of the present disclosure.
Figure 6:
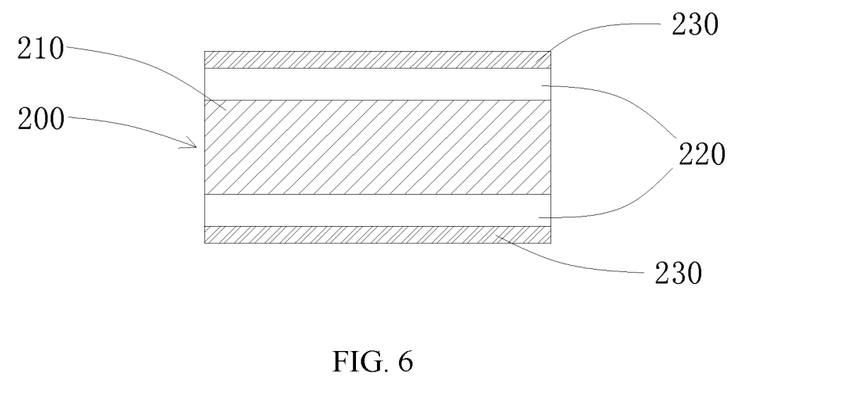

As shown in FIGS. 1-3, an embodiment of the present disclosure provides a current collector production apparatus 100 for producing a current collector 200. The current collector has a multi-layer structure, and includes a current collector substrate 210, a conductive layer 220 disposed on at least one surface of the current collector substrate 210, and a passivation layer 230 formed on one side of the conductive layer 220. In an example, the conductive layer 220 is provided on both surfaces of the current collector substrate 210, as shown in FIG. 6.

As shown in FIG. 1, the current collector production apparatus 100 includes an oven 110 and a passivation ozone knife 120. The oven 110 has a current collector heating chamber configured to heat a current collector substrate 210 to be processed (on which the conductive layer 220 is to be disposed). The passivation ozone knife 120 is disposed inside the oven 110. The passivation ozone knife 120 has a current collector injection port 121. The current collector injection port 121 is configured to release ozone in such a manner that ozone reacts with a surface material of the conductive layer 220 of the current collector 200, so as to form a passivation layer 230, as shown in FIG. 6.

Figure 4:
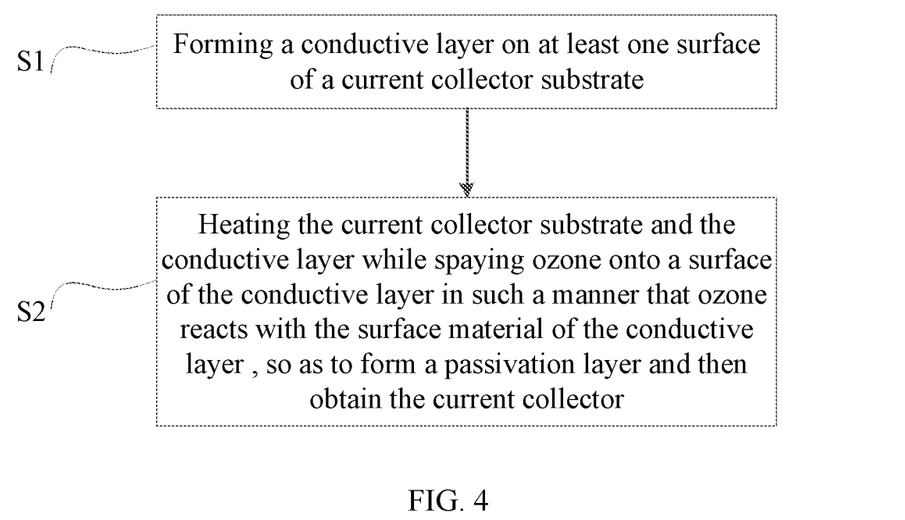
FIG. 4 is a flow chart of a method for producing a current collector according to the present disclosure.

In an embodiment, as shown in FIG. 4, a method for producing the current collector includes the following steps.

Figure 5:
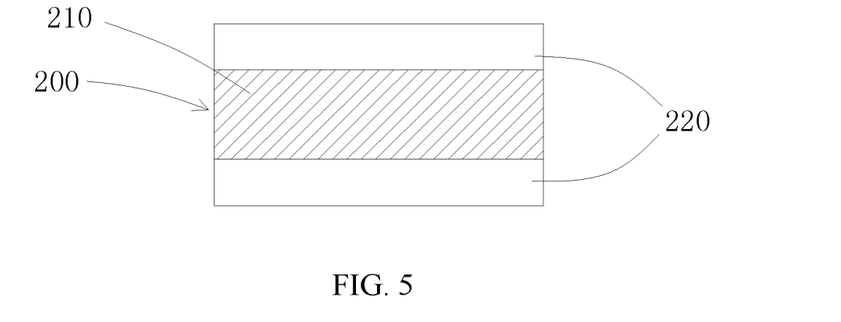
FIGS. 5-6 are each a structural schematic diagram of a current collector in respective steps during a process of producing the current collector with the method provided by the present disclosure.

At step S1, the conductive layer 220 is formed on at least one surface of the current collector substrate 210, so as to form a semi-finished product. The conductive layer 220 can be formed on one surface or both surfaces of the current collector substrate 210, depending on actual needs. For example, as shown in FIG. 5, the conductive layer 220 is formed on both surfaces of the current collector substrate 210.

At step S2, the current collector substrate 210 and the conductive layer 220 are heated while ozone is sprayed onto the surface of the conductive layer 220 in such a manner that ozone reacts with the surface material of the conductive layer 220, so as to form a passivation layer 230 and then obtain the current collector 200. For example, as shown in FIG. 6, the current collector substrate 210 together with the conductive layer 220 can be placed in the oven 110 of the above-mentioned current collector production apparatus, and ozone is sprayed onto the conductive layer 220 by the passivation ozone knife 120, such that the surface material of the conductive layer 220 reacts with ozone in the high temperature environment, so as to form the passivation layer 230.

The current collector substrate 210 can be made of a dielectric material. When the current collector 200 is used as a cathode plate, the conductive layer 220 can be made of aluminum (Al). In this way, aluminum oxide ($Al_2O_3$) (i.e., the passivation layer 230) is formed when the conductive layer 220 reacts with ozone ($O_3$) according to the following chemical formulas:

$$2Al + 3O_3 = Al_2O_3 + 3O_2;\text{ and}$$

$$4Al + 3O_2 = 2Al_2O_3.$$

When the current collector 200 having the passivation layer 230 is applied to form an electrode assembly of a secondary battery, it can prevent the reaction between HF and Al in the electrolyte, thereby solving the problem of detachment of the active material from the current collector 200, and maintaining the performance of the lithium-ion battery.

The conductive layer 220 can be formed on at least one surface of the current collector substrate 210 by vapor deposition, coating, or the like.

In the production process, the current collector substrate 210 is generally in a form of strip which is to be conveyed into the oven 110 by a conveying roller. The current collector production apparatus 100 further includes an uncoiling roll 160 and a coiling roll 170. The semi-finished product formed by the current collector substrate 210 and the conductive layer 220 is placed on the uncoiling roll 160, and then processed by the oven 110 and components in the oven 110 to form the current collector 200, and the current collector 200 is coiled by the coiling roll 170.

Further, the current collector production apparatus 100 further includes a guiding roller 140 and a tension roller 150. Along a conveying direction X of the current collector production apparatus 100, both the guiding roller 140 and the tension roller 150 are disposed on each side of the oven 110, so as to adjust the conveying direction of the current collector substrate 210 and adjust tensile force of the current collector substrate 210 by the tension roller 150. In this way, the current collector substrate 210 is protected from wrinkling, and the flatness of the current collector substrate 210 is improved, so that the conductive layer 220 can react with ozone more uniformly. In an example, the guiding roller 140 is closer to the oven 110 than the tension roller 150 along the conveying direction X, so that the current collector substrate 210 can enter the oven 110 more stably, thereby ensuring a uniform contact between ozone and any part of the conductive layer 220, and improving the quality of passivation layer 230 to be formed.

The guiding roller 140 and the tension roller 150 on one side of the oven 110 are symmetric to the guiding roller 140 and the tension roller 150 on the other side of the oven 110. That is, the two guiding rollers 140 are symmetrical with respect to a center plane of the oven 110 in the conveying direction X, and the two tension rollers 150 are also symmetrical with respect to the center plane of the oven 110 in the conveying direction X, thereby further improving the flatness of the current collector substrate 210.

In order to maintain the flatness of the current collector substrate 210 in the conveying direction X, especially the flatness in the reaction space S, each of the uncoiling roller 160, the guiding roller 140, the tension roller 150, and the coiling roller 170 has a levelness smaller than or equal to 0.02 mm.

In addition, parallelism between any two of the uncoiling roller 160, the guiding roller 140, the tension roller 150, and the coiling roller 170 is smaller than or equal to 0.01 mm, so as to ensure the conveying stability and the flatness of the current collector substrate 210 when passing through these rollers.

As shown in FIG. 2 and FIG. 3, the oven 110 includes an oven main body 111, two mesh plates 112, and a connecting plate 113. The oven main body 111 includes two side plates 1111 disposed oppositely to each other, and a top plate 1112 that connects the two side plates 1111. The mesh plate 112 is provided with mesh holes. The two mesh plates 112 are respectively opposite to and spaced apart from the two side plates 1111. The connecting plate 113 is opposite to and spaced apart from the top plate 1112, and connects the two mesh plates 112. The two mesh plates 112 and the connecting plate 113 are disposed in the oven main body 111. The passivation ozone knife 120 is disposed in a space enclosed by the mesh plates 112 and the connecting plate 113, and the space acts as the reaction space S of the conductive layer 220. That is, the two side plates 1111, the top plate 1112, the two mesh plates 112 and the connecting plate 113 form gas flow passages. Gas in the reaction space S enters one gas flow passage through the mesh holes of one mesh plate 112, and then moves upward along the mesh plate 112, bypasses the connecting plate 113, flows to a gas flow passage opposite to the other mesh plate 112, and then flows back into the reaction space S through the mesh holes of the other mesh plate 112. The arrows shown in FIG. 3 represent the gas flow of the gas in the oven 110, i.e., a gas flow circulation path formed by the gas flow passages and the reaction space S, so that the temperature in the oven 110 can be as uniform as possible, thereby facilitating a sufficient reaction between ozone and the conductive layer 220.

It can be understood that, in the above-mentioned conveying direction, the oven 110 further includes a fixing plate 1113 connecting the two side plates 1111. The fixing plate 1113 is provided with a conveying opening. Further, the oven 110 further includes a bottom plate 1114 that connects the fixing plates 1113 and the side plates 1111, so as to form an enclosed structure of the oven main body 111. The current collector substrate 210 (together with the conductive layer 220) is conveyed into and out of the oven 110 through the conveying opening.

In an embodiment, the two side plates 1111 are opposite to one another with respect to the conveying direction X of the current collector production apparatus 100. That is, the two side plates 1111 are disposed on both lateral sides of the current collector substrate 210, so that the gas flow circulation path surrounds the current collector substrate 210, in order to avoid the influence of the strip of the current collector substrate 210 on the gas flow.

Further, the oven 110 further includes a fan 114 disposed between the top plate 1112 and the connecting plate 113. The fan 114 promotes the circulation of gas flow in the entire oven 110, thereby reaching a more uniform environment temperature in the reaction space S.

In the gas flow passage, a negative pressure chamber is formed in a region located on a gas inlet of the fan 114 forms, and a positive pressure chamber is formed in a region located on a gas outlet of the fan 114 forms. That is, the gas in the reaction space S first enters the negative pressure chamber, and then returns to the reaction space S from the positive pressure chamber. In order to make the gas flow in the entire gas flow passage uniform, among the mesh holes of the mesh plate 112, the opening area of the mesh holes located at a side close to the top plate 1112 is smaller than that at the opposite side (i.e., a side close to the bottom plate 1114). In other words, no matter in the negative pressure chamber or the positive pressure chamber, the opening area of the mesh holes close to the fan 114 (i.e., close to the top plate 1112) is always smaller than that at the opposite side. In this way, in the negative pressure chamber, the negative pressure becomes higher when approaching the side of the negative pressure chamber close to the fan 114 (i.e., the side close to the top plate 1112), and an amount of gas entering the negative pressure chamber can be reduced due to the decreasing opening area of the mesh holes. The negative pressure on the other side of the negative pressure chamber (i.e., the side close to the bottom plate 1114) is lower, and the amount of gas entering the negative pressure chamber can be increased due to the increasing opening area of the mesh holes. Thus, the amount of gas is relatively uniform throughout the negative pressure chamber and the gas flow is uniform, such that the gas flow is uniform in the part of the reaction space S close to the negative pressure chamber. In this positive pressure chamber, the positive pressure becomes higher when approaching the side close to fan 114 (i.e., the side close to the top plate 1112), and an amount of gas entering the reaction space S can be reduced due to the decreasing opening area of the mesh holes. The positive pressure on the other side of the positive pressure chamber (i.e., the side close to the bottom plate 1114) is relatively lower, and the amount of gas entering the reaction space S can be increased due to the increasing opening area of the mesh holes. Thus, the amount of gas is relatively uniform throughout the positive pressure chamber and the gas flow is uniform, such that the gas flow is uniform in the part of the reaction space S close to the positive pressure chamber. In this way, the gas flow is uniform throughout the reaction space S, and thus the temperature is consistent throughout the reaction space S.

In an embodiment, along a direction from the bottom to the top of the oven 110, i.e., a positive direction of the height direction Z, an opening area of each mesh hole on the mesh plate 112 is gradually reduced, in order to reach a more uniform temperature throughout the reaction space S.

The oven 110 can be provided with a separate heating mechanism, or the side plate 1111 can be a heating plate, or the fan 114 can be a hot gas fan. In an embodiment, the side plate 1111 is a heating plate, and in the meantime, the fan 114 is a hot gas fan, in order to maintain the temperature inside the reaction space S.

In order to maintain the temperature in the oven 110, the current collector production apparatus 100 further includes two negative pressure transition chambers 130. The two negative pressure transition chambers 130 are respectively connected to both sides of the oven 110 along the conveying direction X of the current collector production apparatus 100. The negative pressure transition chamber 130 communicates with the inner space of the oven 110. Since the gas pressure in the negative pressure transition chamber 130 is lower than the ambient pressure, the negative pressure transition chamber 130 can prevent the gas in the reaction space S from flowing outwardly, so as to maintain the temperature in the reaction space S. Since the negative pressure transition chamber 130 communicates with the gas flow passage, even if part of the gas in the reaction space S flows to the negative pressure transition chamber 130, the gas will still be driven by the fan 114 to return into the reaction space S again along the gas circulation path.

As shown in FIG. 3, along a width direction Y of the current collector substrate 210, the negative pressure transition chamber 130 has a same width as the oven main body 111, so that the negative pressure transition chamber 130 extends to and communicates with the gas flow passage over the entire width in the width direction Y.

It can be understood that, even if the negative pressure transition chambers 130 are provided, it is inevitable that gas in the reaction space S may leak, and thus the temperature in the reaction space S may be unstable; or in the process of conveying, some foreign matter may drop onto the current collector substrate 210 and affect the reaction of the conductive layer 220. In order to solve the above problems, in an embodiment, along the above-mentioned conveying direction X, a sealing brush is provided at a side of the negative pressure transition chamber 130 facing away from the oven 110. The sealing brush is configured to seal the oven 110 and to maintain the temperature inside the oven 110. In addition, the sealing brush can clean the surface of the conductive layer 220 before the current collector substrate 210 enters the oven 110, so as to guarantee a clean surface of the conductive layer 220 and a high quality of the passivation layer 230 to be formed.

In the above embodiments, only one passivation ozone knife 120 or a plurality of passivation ozone knifes 120 can be provided. When a plurality of passivation ozone knifes 120 is provided, the current collector injection ports 121 of at least two passivation ozone knifes 120 inject gas in opposite directions. A current collector accommodating space is formed between the at least two passivation ozone knifes 120 injecting gas in opposite directions. In other words, the at least two passivation ozone knifes 120 injecting gas in opposite directions are respectively disposed above and below the current collector substrate 210. In this way, when both surfaces of the current collector substrate 210 are provided with the conductive layers 220, the surface material of the two conductive layers 220 can simultaneously react with ozone to form the passivation layer 230, thereby improving the production efficiency of the current collector 200. In an embodiment, each of the passivation ozone knifes 120 can be controlled separately. When only one surface of the current collector substrate 210 is provided with the conductive layer 220, the passivation ozone knifes 120 facing the conductive layer 220 can be controlled to operate, while the passivation ozone knifes 120 facing away from the conductive layer 220 can be switched-off to save energy.

In order to simplify the maintenance of each passivation ozone knife 120, along the conveying direction X of the current collector production apparatus 100, the current collector injection ports 121 are disposed in a stagger manner. In other words, along the conveying direction X, a gap is remained between adjacent passivation ozone knifes 120. In the embodiment in which the passivation ozone knifes 120 are respectively disposed on an upper surface and a lower surface (along a height direction Z) of the current collector substrate 210, the current collector injection ports 121 are close to the current collector substrate 210. If the current collector injection ports 121 on the upper and lower surfaces are opposite to each other, a distance between the opposite current collector injection ports 121 is small, and in this regard, one may be touched when cleaning or replacing the other one. In the stagger manner, it can provide more space for maintenance work, such as cleaning the current collector injection ports 121. In this way, a probability of touching a current collector injection port 121 can be reduced when cleaning and replacing another current collector injection port 121.

Further, the current collector injection port 121 injects gas in a direction perpendicular to the current collector substrate 210, i.e., ozone is perpendicularly injected on the conductive layer 220, so that a boding force between the ozone and the conductive layer 220 is enhanced. In this way, they can react sufficiently and the quality of the passivation layer 230 to be formed can be improved. In another embodiment, the current collector injection port 121 injects gas in an inclination angle with respect to the current collector substrate 210.

In order to concentrate the gas, the current collector injection port 121 of the passivation ozone knife 120 is provided in a flat mouth structure. Considering that a gas speed in a central region of the current collector injection port 121 is more uniform than that in the edge region, the current collector injection port 121 of the passivation ozone knife 120 is set to have a larger width (a dimension along the width direction Y of the current collector substrate 210) than the current collector substrate 210. Thus, during processing, the central region of the current collector injection port 121 directly faces the current collector substrate 210, and the two edge regions are respectively located at the two sides of the current collector substrate 210 along the width direction Y. In this way, ozone reaching the conductive layer 220 mainly comes from the central region of the current collector injection port 121, and the gas speed is relatively uniform.

In an embodiment, a distance between the current collector injection port 121 and the conductive layer 220 is greater than or equal to 1 mm and smaller than or equal to 40 mm, such as the distance between the current collector injection port 121 and the conductive layer 220 is 1 mm, 2 mm, 8 mm, 10 mm, 15 mm, 18 mm, 20 mm, 25 mm, 30 mm, or 40 mm. In an embodiment, the distance between the current collector injection port 121 and the conductive layer 220 is greater than or equal to 10 mm, and smaller than or equal to 20 mm, so that ozone injected from the current collector injection port 121 can reach and react with the conductive layer 220 as much as possible, so as to increase the utilization of ozone.

It can be understood that there is specific requirement on a thickness of the passivation layer 230 of the current collector 200. In order to satisfy this requirement, the gas speed of the passivation ozone knife 120 is greater than or equal to 5 m/min and smaller than or equal to 50 m/min. For example, the gas speed can be 5 m/min, 10 m/min, 15 m/min, 20 m/min, 22 m/min, 25 m/min, 28 m/min, 30 m/min, 35 m/min, or 40 m/min. In an embodiment, the gas speed of the passivation ozone knife 120 is greater than or equal to 20 m/min and smaller than or equal to 30 m/min.

Further, the temperature of the oven 110 is higher than or equal to 100° C., and lower than or equal to 250° C., such as 100° C., 150° C., 180° C., 200° C., 205° C., 210° C., 220° C., 225° C., or 230° C. In an embodiment, the temperature of the oven 110 is higher than or equal to 200° C. and lower than or equal to 230° C., so as to control the reaction rate of the surface material of the conductive layer 220 with ozone, and control the thickness of the passivation layer 230.

In the above step S2, the time for heating the current collector substrate 210 and the conductive layer 220 is greater than or equal to 2 s and smaller than or equal to 60 s. For example, the heating time can be 2 s, 4 s, 5 s, 6 s, 10 s, 15 s, 20 s, 25 s, 28 s, 30 s, 35 s, 50 s, 55 s, or 60 s. In an embodiment, the time for heating the current collector substrate 210 and the conductive layer 220 is greater than or equal to 5 s and smaller than or equal to 30 s, so as to ensure the temperature of the conductive layer 220, thereby further ensuring the reaction of its surface material with ozone. In an embodiment, the above heating time can be adjusted depending on the dimension of the oven 110 and the conveying speed.

Further, in order to ensure a sufficient reaction between the surface material of the conductive layer 220 and ozone, purity of ozone can be greater than or equal to 80%, such as 80%, 85%, 90%, 99%, or the like.

The embodiments according to the present disclosure discussed above are merely illustrative embodiments, but not intended to limit the present disclosure. The technical solution according to the present disclosure can be modified in various manners. Any modifications, equivalent replacements, improvements within the spirit and principles of the present disclosure should be included in the scope of protection of the present disclosure.

What is claimed is:

1. A current collector production apparatus for producing a current collector, the current collector comprising a current collector substrate and a conductive layer provided at least on one surface of the current collector substrate, the current collector production apparatus comprising:
    an oven having a space where the current collector is to be heated; and
    a passivation ozone knife disposed inside the oven and comprising a current collector injection port,
    wherein the current collector injection port is configured to release ozone in such a manner that the ozone reacts with a surface material of the conductive layer of the current collector, so as to form a passivation layer,
    wherein the oven comprises:
        an oven main body comprising two side plates opposite to one another and a top plate that connects the two side plates;
        two mesh plates arranged in the oven main body, the two mesh plates being opposite to and spaced apart from the two side plates, respectively; and
        a connecting plate opposite to and spaced apart from the top plate, the connecting plate connecting the two mesh plates,
    wherein the passivation ozone knife is disposed in a space enclosed by the two mesh plates and the connecting plate.

2. The current collector production apparatus according to claim 1, wherein the two side plates are opposite to one another with respect to a horizontal direction of the current collector production apparatus.

3. The current collector production apparatus according to claim 1, wherein the oven further comprises a fan disposed between the top plate and the connecting plate,
    each of the two mesh plates has a plurality of mesh holes, and one of the plurality of mesh holes close to the top plate has a smaller opening area than one of the plurality of mesh holes away from the top plate.

4. The current collector production apparatus according to claim 1, wherein a plurality of passivation ozone knives is provided, the current collector injection ports of at least two of the plurality of passivation ozone knives inject gas in opposite directions, and a current collector accommodating space is formed between the at least two of the plurality of passivation ozone knives injecting gas in opposite directions.

5. The current collector production apparatus according to claim 4, wherein the current collector injection ports of the plurality of passivation ozone knives are disposed in a staggered manner along a horizontal direction of the current collector production apparatus.

6. The current collector production apparatus according to claim 1, further comprising a guiding roller and a tension roller,
    wherein the guiding roller and the tension roller are disposed on each side of the oven along a horizontal direction of the current collector production apparatus, and the guiding roller is closer to the oven than the tension roller along the horizontal direction.

7. The current collector production apparatus according to claim 1, further comprising two negative pressure transition chambers respectively communicating with two sides of the oven along a horizontal direction of the current collector production apparatus.

8. A current collector production apparatus for producing a current collector, the current collector comprising a current collector substrate and a conductive layer provided at least on one surface of the current collector substrate, the current collector production apparatus comprising:
    an oven having a space where the current collector is to be heated; and
    a passivation ozone knife disposed inside the oven and comprising a current collector injection port,
    wherein the current collector injection port is configured to release ozone in such a manner that the ozone reacts with a surface material of the conductive layer of the current collector, so as to form a passivation layer, and
    wherein a plurality of passivation ozone knives is provided, the current collector injection ports of at least two of the plurality of passivation ozone knives inject gas in opposite directions, and a current collector accommodating space is formed between the at least two of the plurality of passivation ozone knives injecting gas in opposite directions.

9. The current collector production apparatus according to claim 8, wherein the current collector injection ports of the plurality of passivation ozone knives are disposed in a staggered manner along a horizontal direction of the current collector production apparatus.

10. The current collector production apparatus according to claim 8, further comprising a guiding roller and a tension roller,
wherein the guiding roller and the tension roller are disposed on each side of the oven along a horizontal direction of the current collector production apparatus, and the guiding roller is closer to the oven than the tension roller along the horizontal direction.

11. The current collector production apparatus according to claim 8, further comprising two negative pressure transition chambers respectively communicating with two sides of the oven along a horizontal direction of the current collector production apparatus.

12. A method for producing a current collector with the current collector production apparatus according to claim 1, the method comprising:
forming a conductive layer on at least one surface of a current collector substrate;
heating the current collector substrate and the conductive layer in the oven while spraying ozone from the current collector injection port of the current collector production apparatus onto a surface of the conductive layer in such a manner that ozone reacts with a surface material of the conductive layer, so as to form a passivation layer and then obtain the current collector.

13. The method according to claim 12, wherein a distance between the current collector injection port and the conductive layer is greater than or equal to 1 mm, and smaller than or equal to 40 mm.

14. The method according to claim 12, wherein a distance between the current collector injection port and the conductive layer is greater than or equal to 10 mm, and smaller than or equal to 20 mm.

* * * * *